US012624656B1

(12) United States Patent　　　(10) Patent No.:　US 12,624,656 B1

Ahdoot　　　(45) Date of Patent:　May 12, 2026

(54) SELF-COOLED ROTARY ENGINE AND PUMP

(71) Applicant: Ned M Ahdoot, Los Angeles, CA (US)

(72) Inventor: Ned M Ahdoot, Los Angeles, CA (US)

( * ) Notice: Subject to any disclaimer, the term of this patent is extended or adjusted under 35 U.S.C. 154(b) by 0 days.

(21) Appl. No.: 19/285,832

(22) Filed: Jul. 30, 2025

(51) Int. Cl.
| | |
|---|---|
| *F02C 3/16* | (2006.01) |
| *F01C 9/00* | (2006.01) |
| *F01C 19/00* | (2006.01) |
| *F01C 21/04* | (2006.01) |
| *F02C 6/20* | (2006.01) |
| *F02C 7/18* | (2006.01) |
| *F02C 7/36* | (2006.01) |
| *F03C 4/00* | (2006.01) |

(52) U.S. Cl.
CPC ................. *F02C 3/16* (2013.01); *F01C 9/00* (2013.01); *F01C 19/00* (2013.01); *F01C 21/04* (2013.01); *F02C 6/20* (2013.01); *F02C 7/18* (2013.01); *F02C 7/36* (2013.01); *F03C 4/00* (2013.01); *F05D 2260/232* (2013.01); *F05D 2260/4031* (2013.01)

(58) Field of Classification Search
CPC ...... F02C 3/16; F02C 6/20; F02C 7/18; F02C 7/36; F01C 9/00; F01C 19/00; F01C 21/04; F03C 4/00; F05D 2260/232; F05D 2260/4031
USPC ............................................. 123/18 R, 18 A
See application file for complete search history.

(56) References Cited

U.S. PATENT DOCUMENTS

| | | | | |
|---|---|---|---|---|
| 4,599,976 A | * | 7/1986 | Meuret ................... | F01C 9/002 |
| | | | | 123/193.6 |
| 5,086,732 A | * | 2/1992 | Seno ....................... | F02B 53/00 |
| | | | | 123/18 R |
| 6,202,600 B1 | * | 3/2001 | Miceli .................... | F01C 9/002 |
| | | | | 123/18 R |
| 2007/0297928 A1 | * | 12/2007 | Volftsun ................... | F01C 1/07 |
| | | | | 418/38 |
| 2015/0337724 A1 | * | 11/2015 | Ahdoot ................... | F01C 1/063 |
| | | | | 123/205 |
| 2022/0018282 A1 | * | 1/2022 | Stanetsky ............... | F02B 55/02 |

* cited by examiner

*Primary Examiner* — Hoang M Nguyen

(74) *Attorney, Agent, or Firm* — Trojan Law Offices, P.C.

(57) ABSTRACT

A rotary combustion engine includes a cylindrical housing with a plurality of internal cavities. Each of the internal cavities is a cylindrical segment of the housing, and a plurality of stationary blades are attached to its inner wall. The stationary blades extend inward to ride along the surface of a central shaft, contacting the shaft with a seal. Each cavity contains a rotor blade attached to the shaft and configured to drive the shaft. Each rotor blade extends outwardly to an inner curve of the housing with a sealing means. Each of the plurality of rotor blades has a reciprocating circular motion inside each of the cavities along the shaft between each of the stationary blades, thereby generating rotational power, delivering compressed rotational force, and provides cooling for the cavity.

20 Claims, 6 Drawing Sheets

| 0<br>Degree | Cavity 1 | | | Cavity 2 | | | Cavity 3 | | 360<br>Degree |
|---|---|---|---|---|---|---|---|---|---|
| | C1T1<br><br>Duration<br>120<br>degrees | C1T2<br><br>Duration<br>120<br>degrees | C1T3<br><br>Duration<br>120<br>degrees | C2T1<br><br>Duration<br>120<br>degrees | C2T2<br><br>Duration<br>120<br>degrees | C2T3<br><br>Duration<br>120<br>degrees | C3T1<br><br>Duration<br>120<br>degrees | C3T2<br><br>Duration<br>120<br>degrees | C3T3<br><br>Duration<br>120<br>degrees |

*FIG. 10*

SELF-COOLED ROTARY ENGINE AND PUMP

FIELD OF THE INVENTION

The present invention relates to rotary engines, and more particularly to a rotary engine having an improved housing, rotor blades, stationary blades, and 360 degree compression cycle

BACKGROUND

Rotary engines are known in the art, being internal combustion engines usually designed with a number of cylinders provided in a radial configuration. In their initial configuration, an engine's crankshaft remained stationary in operation, while the entire crankcase and its attached cylinders rotated about it as a unit. Rotary engines currently known in the art present several drawbacks, including inefficient combustion cavities, air and exhaust management and oiling systems.

For these reasons it is an object of the present invention to provide a rotary combustion engine that has multiple internal cavities capable being configured in various shapes and which derive their power from a common shaft for compressing air and injecting compressed air into combustion cavities in a single cycle 360 degree rotation of the shaft. Another object of the invention is to provide a mechanism for addressing partial turning of the shaft by each rotor blade to achieve the 360 rotation by selective gearing, These and other objects are more fully described in the following specification and drawings.

SUMMARY

A rotary combustion engine includes a cylindrical housing comprising a curved inner wall, a first end plate, and a second end plate. A plurality of internal cavities is formed within the housing, wherein each of the internal cavities comprises a cylindrical segment of the housing. A plurality of stationary blades is attached to the inner wall. The stationary blades divide an inner volume of the housing in pie-shaped divisions around 360-degrees of the housing.

The stationary blades connect to the inner wall of the housing and extend inward to ride along the surface of a central shaft. The stationary blades thereby forming a plurality of sealed cavities. The central shaft is centered along a longitudinal axis of the housing along a longitudinal line of rotation of the housing, and the outside surface of the shaft is sealed by sealing means.

The stationary blades contact the shaft with a seal configured to prevent fluid leakage between each of the cavities, and wherein multiple cavities are formed in the housing such that each cavity is formed and bounded by the inner curved walls of the housing, the shaft, and at least one of the stationary blades. Each cavity contains a rotor blade attached to the shaft and configured to drive the shaft, wherein each rotor blade extends outwardly to an inner curve of the housing with a sealing means. And each of the plurality of rotor blades has a reciprocating circular motion inside each cavity along the shaft, thereby generating rotational power, delivering compressed rotational force, and provides cooling for the cavity.

The shaft preferably provides rotational power to a vehicle, wherein compression from rotational force of the rotor blade in a single cycle comprises bi-directional semi-rotation and retraction of the rotor blade, and wherein the shaft is connected to a gear box outside of the housing, with the gear box configured to deliver bidirectional force to each rotor blade. The gear box may be configured to provide a reciprocating arc motion which drives each rotor blade back to its original position after combustion, compression, or cooling cycles. The shaft may be turned in one direction by a semi-circular gear connecting a rotor blade handle to the shaft, wherein an outer surface of the shaft includes semi-circular segments of gears alternating with smooth semi-circular segments.

The teeth on the roller blade handle are configured to engage a semi-circular segment of gears to rotate it the shaft when the rotor blade begins a cycle, and engages a smooth semi-circular segment as the rotor blade returns to its original position. A pair of circular rings is configured to rotate around the shaft, and the circular rings are connected to one of the rotor blades to guide the circular rotation of the rotor blade within the cavity. A gear box stationed outside the cavity is provided to return the rotor blade to its original position after combustion.

Each rotor blade inside a cavity forms two sealed chambers with respect to the rotational direction of the inner shaft, the front of the stationary blade, and the back of each rotor blade. The housing is provided with insertion ports from an outer surface to the curved inner walls, a pressured air valve, a fuel injection valve, and a multiplicity of spark plugs.

An exhaust gas diode valve is preferably included, wherein each rotor blade is configured such that forward motion urges in cool ambient air by forward motion of the rotor blade while the exhaust valve is closed. Warmed air from a cavity is pushed out of the housing by each of the rotor blades before reaching the second stationary blade, and ambient air from outside the housing fills the expanding space between the front of each rotor blade and the back of a stationary blade, thereby cooling the housing.

Preferably, multiple combustion cycles are active simultaneously in a 360-degree period of shaft rotation, wherein each rotor blade gets pushed forward by ignition and is returned to its original position by the gear box. At the start of a suction/compression cycle, ambient air enters into the chamber through a diode valve in between a stationary blade and a rotor blade by vacuum action, and when each rotor blade moves to its original start position, a diode valve opens allowing combustion products into the cavity to fill the space between a rotor blade and a stationary blade, and wherein pressurized combustion products are pushed out of opening.

Each of the cavities are preferably configured to allow the engine to be cooled while a combustion cycle is in progress, wherein at the beginning of a cycle a vacuum is generated to move ambient air into an opening behind a rotor blade, wherein the ambient air is gets warmed up by the heat of the engine, and upon the return of a rotor blade, warmed air is pushed out through the same opening to cool the engine. Oil may be injected from outside of the cavity into a small segment of the inner wall of the housing, and a brush like substance capable of absorbing oil is disposed on the inner wall.

Timing is performed by a system of gears and an electromechanical device synchronized to the rotation of the shaft. A circular plate is attached to the shaft, wherein edges of the plate having multiple small openings for timed divisions of a cycle related to the rotation of the shaft and a small opening along the circular plate to establish an arbitrary time to designate the beginning of a cycle. A gear box may be provided, configured to return each rotor blade to its original position, wherein the shaft extends from the combustion engine to a gear plate, wherein a second shaft is connected to the to an outer circular device, rotating it counterclockwise semicircular motions to pull and release a sting coupled to all rotor blades, thereby moving them to their original position in synchronization with the shaft.

In one preferred implementation, a 3-combustion engine housing completes a combustion cycle three times in every 120 degrees of rotation. Each of the rotor blades may be returned in a cavity to its original position within a 360-degree revolution of the shaft, and the shaft may be connected to a plurality of helixes that run diagonally with respect to centerline of the shaft and extend outwardly touching the inner wall of the housing.

BRIEF DESCRIPTION OF THE FIGURES

FIG. 10 illustrates a sequential combustion table timing for an implementation having multiple combustion chambers.

DESCRIPTION

The present invention is described more fully hereinafter, but not all embodiments are shown. While the invention has been described with reference to exemplary embodiments, it will be understood by those skilled in the art that various changes may be made, and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present application. Additionally, the drawings are not drawn to scale. Common elements between different figures may retain the same numerical designation.

Figure 1:
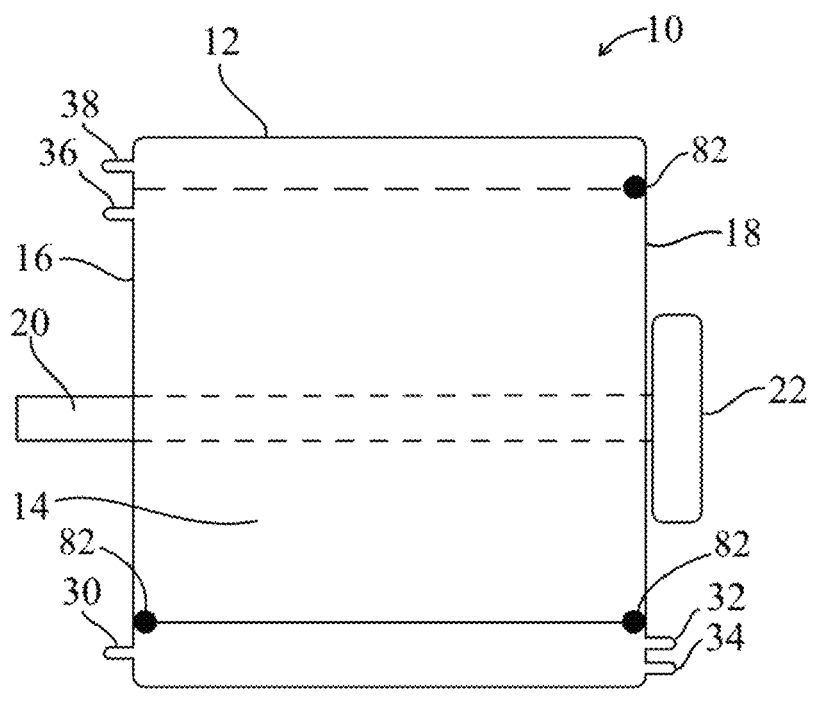
FIG. 1 illustrates a rotary combustion engine.
Figure 1A:
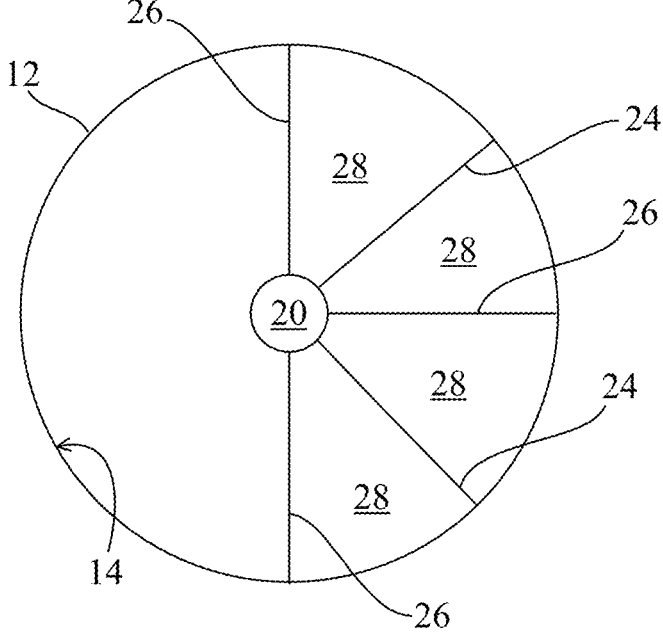
FIG. 1A illustrates the rotary combustion engine of FIG. 1 wherein a plurality of rotor blades are positioned between a plurality of stationary blades.

Referring to FIGS. 1 and 1A, a rotary combustion engine 10 comprises a cylindrical housing 12 having an inner wall 14 defining a cylindrical inner surface. A first end plate 16 and a second end plate 18 are attached to either side of the housing 12 to form a cylindrical enclosure. A shaft 20 is disposed along a central axis of the housing 12 to provide mechanically powered circular motion. The shaft 20 extends through the housing 12, the first end plate 16 and the second end plate 18, and terminates outside the housing 12 at a gear box 22.

Referring to FIG. 1A, a plurality of rotor blades 24 are positioned between a plurality of stationary blades 26. The rotor blades 24 have a reciprocating circular motion inside the housing 12, and are attached to the shaft 20. The rotor blades 24 move back and forth, rotating in portions of 360-degrees, thereby rotating the shaft 20 inside the housing 12. A plurality of closed cavities 28 are defined by the rotor blades 24 and the stationary blades 26 inside the housing 12, with each closed cavity 28 bounded by the inner wall 14, a stationary blade 26, the shaft 20, and a rotor blade 24. Each of the closed cavities 28 forms a combustion chamber, a suction/compression chamber, or a combination of the two.

Combustion takes place in between one of the stationary blades 26 and one of the rotor blades 24. When a rotor blade 24, which is fixed to the shaft 20, is pushed away from a stationary blade 26 by the ignition of compressed air and injected gas, the rotor blade causes circular, rotating the shaft 20 to provide powered mechanical rotation. The rotor blade 24 rotates the shaft in one direction and at the end of a designated distance of travel (up to the next stationary blade 26), and then the gear box 22 positioned outside the housing 12 returns the rotor blade 24 to its original position.

At the start of the combustion cycle, a mixture of pressurized air and gas is introduced to a combustion chamber 28, to be ignited in sequenced timing through a pressurized air intake 30, pressurized gas intake 32, and using an ignition spark plug 34, which are positioned outside each closed cavity 28. The closed cavity 28 functions as a combustion chamber and when air and gas are fed into each individual closed cavity. The air intake 30, gas intake 32, and the spark plug 34 are each situated in between a stationary blade 26 and a rotor blade 24. The injected pressurized air can be increased for operating a diesel engine, which would operate without the need for any spark plug 34.

When the spark plug ignites the mixture of pressured air and gas, the ignition causes the rotor blade 24 to travel forward toward another stationary blade 26 and forcing the shaft to rotate. The exhaust gas in the back of the rotor blade is pushed through a diode pressure valve 36, which lets the exhaust gas out of each closed cavity 28 acting as a combustion chamber. The diode pressure valve is opened at an optimal time before the rotor blade 24 reaches the diode pressure valve 36 and is closed by the rotor blade 24 when the rotor blade begins to return to its original position near a stationary blade 26.

Still referring to FIG. 1, when a rotor blade 24 is moved back toward a stationary blade 26, a vacuum is generated inside the closed cavity 28 and ambient air is introduced into the closed cavity 28 through an ambient air opening 38, located behind a stationary blade 26 and in front of a rotor blade 24 as the rotor blade 24 returns to a starting position. Ambient air fills the closed cavity 28 until the rotor blade 24 reaches its initial position, thereby completing a combustion cycle. In the next cycle, when the rotor blade 24 starts moving towards the stationary blade 26, the warmed ambient air is pushed out of the closed cavity 28, thereby cooling the engine. This heat transfer by ambient air takes place as long as combustion is in progress. The position of the number(s) and position(s) of the cooling chamber is decided during the initial engine design.

At the beginning of the cooling cycle, air from the air intake 30 enters between a stationary blade 26 and a rotor blade 24. The air is sucked in under pressure while the rotor blade 24 moves forward. The warmed air is then pushed out at the end of the cooling cycle. The ambient air absorbs heat from the engine block, i.e., the housing, and the stationary blade 26 and rotor blade 24. The position and number of closed cavities 28, i.e., combustion and cooling chambers, are established during initial engine design. A ring 82 is installed at both ends of each rotor blade 24 for lubrication and to prevent wear and tear.

Figure 2:
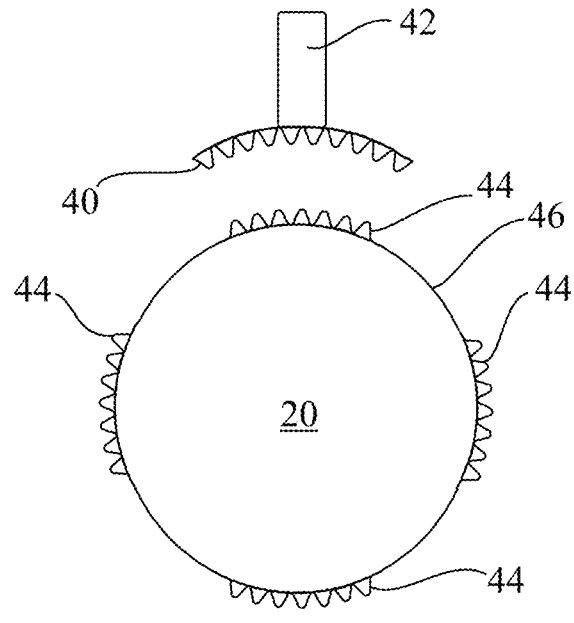
FIG. 2 illustrates a schematic of a rotary combustion engine shaft turning in a first direction.

Referring to FIG. 2, a schematic wherein the shaft 20 is turned in only one direction is shown. A series of semi-circular gears 40 is provided, connected to a rotor blade handle 42 to turn the shaft 20. On the shaft 20 there are semi-circular segments of shaft gear teeth 44, alternating with smooth portions 46 of the shaft 20. When the shaft 20 is rotating, the semi-circular gears 40 on the roller blade handle 42 engage the shaft gear teeth 44 in order to rotate the shaft 20.

When a rotor blade 24 is returning to its original position, the smooth portion 46 of the shaft 20 allows the rotor blade 24 to return to its original position. The semicircular movement of the rotor blades 24 cause the shaft 20 to rotate in only one direction. Synchronization of the gears is accomplished by the gear box 22 and adjustments are done when the engine is manufactured.

Figure 3:
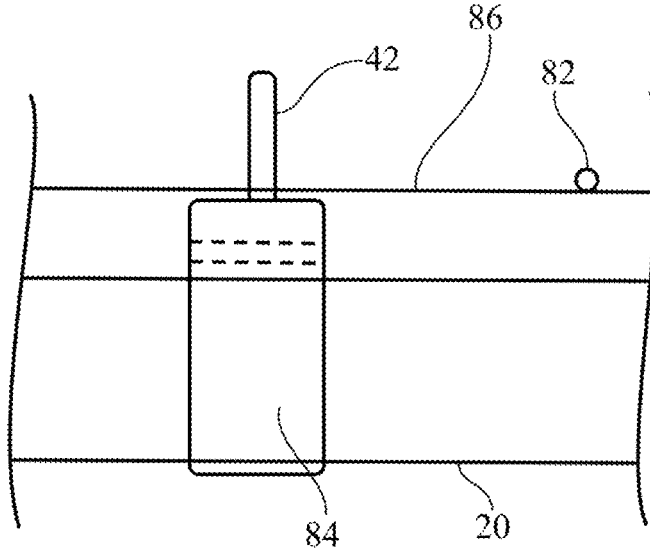
FIG. 3 illustrates a shaft ring configured to rotate around the shaft of a rotary combustion engine.

FIG. 3 shows a shaft ring 84 which rotates around the shaft 20. The shaft ring 84 may be comprised of several rings. The shaft ring 84 is coupled to a rotor blade 24 with the rotor blade handle 42 to guide rotation of the rotor blade 24 within the closed cavity 28 (see, FIG. 1A). For the return motion of a rotor blade 24, the gear box 22 is stationed outside the cavity, which returns the rotor blade 24 to its original position after combustion. A shaft tube 86 covers the shaft 20.

Figure 4:
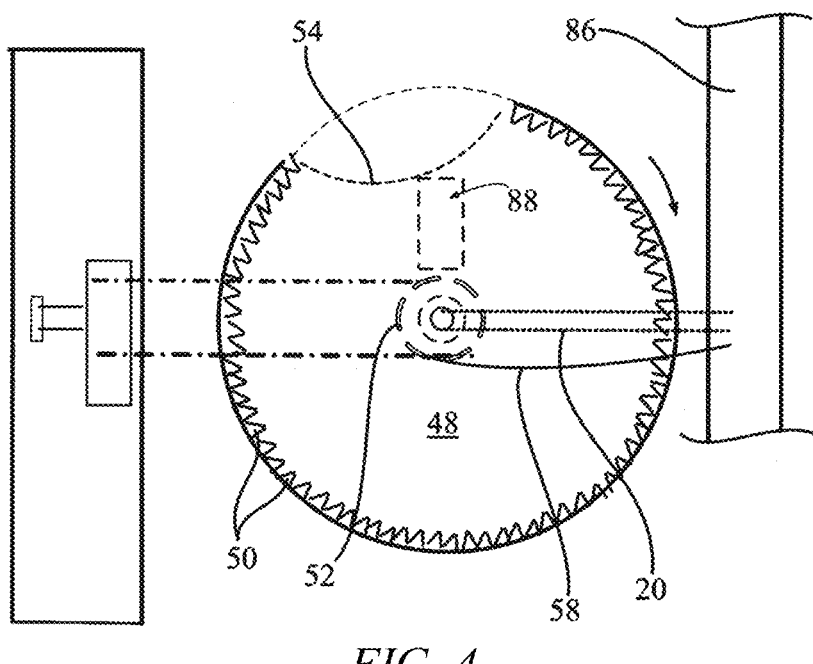
FIG. 4 illustrates the inside of a gear box structure of the rotary combustion engine for returning a rotor blade to a starting position.

FIG. 4 describes the inside of the gear box 22 structure for returning the rotor blade 24 to its original position for a single closed cavity 28. The shaft 20 is extended from the combustion engine that is part of the engine outside covering 86 and ends at a gear plate 48. The gears 50 of the gear plate 48 are coupled with the shaft 20. A segment of the gear plate 48 and its gears 50 comprises a gear plate gear cutout 54 to allow a rotor blade 24 to move forward during a combustion period, which may be a 30-degree combustion period. A back-and-forth transfer apparatus 88 (FIG. 5) is activated by the gear cutout 54 and is connected to a second shaft.

When the gear cutout 54 is reached by virtue of rotation of the shaft 20, relative to the stationary position of the transfer apparatus 88, the secondary shaft 52 is rotated. A semicircular movement of the secondary shaft 52 pulls string 58 connected to a rotor blade 24. As the secondary shaft 52 rotates in semicircular motions it will pull and release the string 58. It also rotates the rotor blade 24 to a position to start the next cycle. In the next cycle, when ignition starts, it pushes the rotor blade 24 up towards a stationary blade 26, as shown in FIG. 1. At the end of the combustion period, the string 58 pushes the rotor blade 24 back, to start the next cycle. This back-and-forth motion of the string 58 is the basis of synchronization for all other timings of the engine.

For a multi combustion engine, the above process is repeated for the number of combustion chambers (closed cavities 28) chosen for a particular engine. A single combustion cycle takes place once every rotation, or 360 degrees. For a housing 12 of a 3-combustion engine, the combustion cycle occurs three times in every 120 degrees. Given a combustion cycle effectiveness of around 30 degrees after ignition, the remaining 90 degrees is used for the rotor to move, in a 120 degree time cycle for combustion, and to move a rotor blade 24 back to its original position inside the closed cavity 28.

Figure 5:
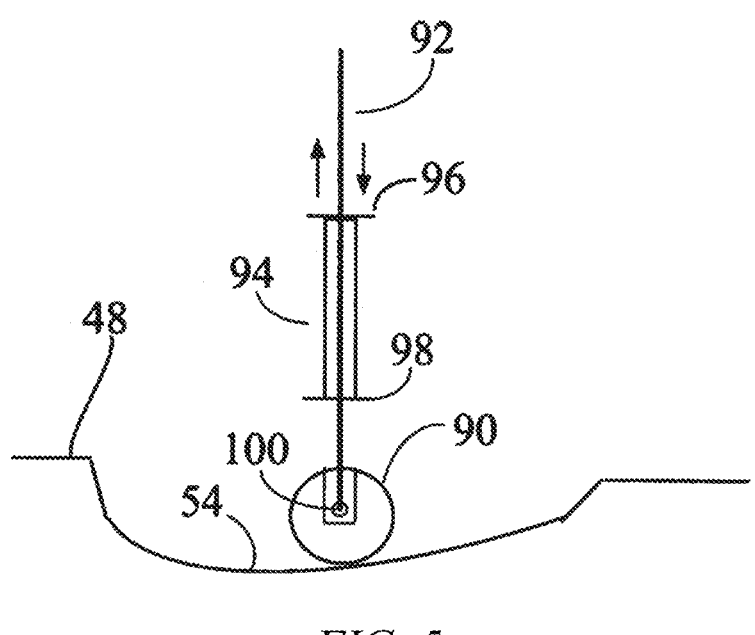
FIG. 5 illustrates a back-and-forth transfer apparatus for transferring motion of the shaft.

Referring now to FIG. 5, the back-and-forth transfer apparatus 88 transfers the back-and-forth motion due dipping in the gear plate 48 gear cutout 54 and transfers back-and-forth motion in the rotor blade 24. A roller 90 with a hub 100 is provided and motion of the roller 90 is caused by it traveling along the gear plate 48 and into the gear cutout 54, and that motion is transferred to Roller Blade by roller blade connector 92. A spring 94 is provided, bounded by a first anchor 96 and a second anchor 98 to guide the up and down motion of the roller blade connector 92.

Figure 6:
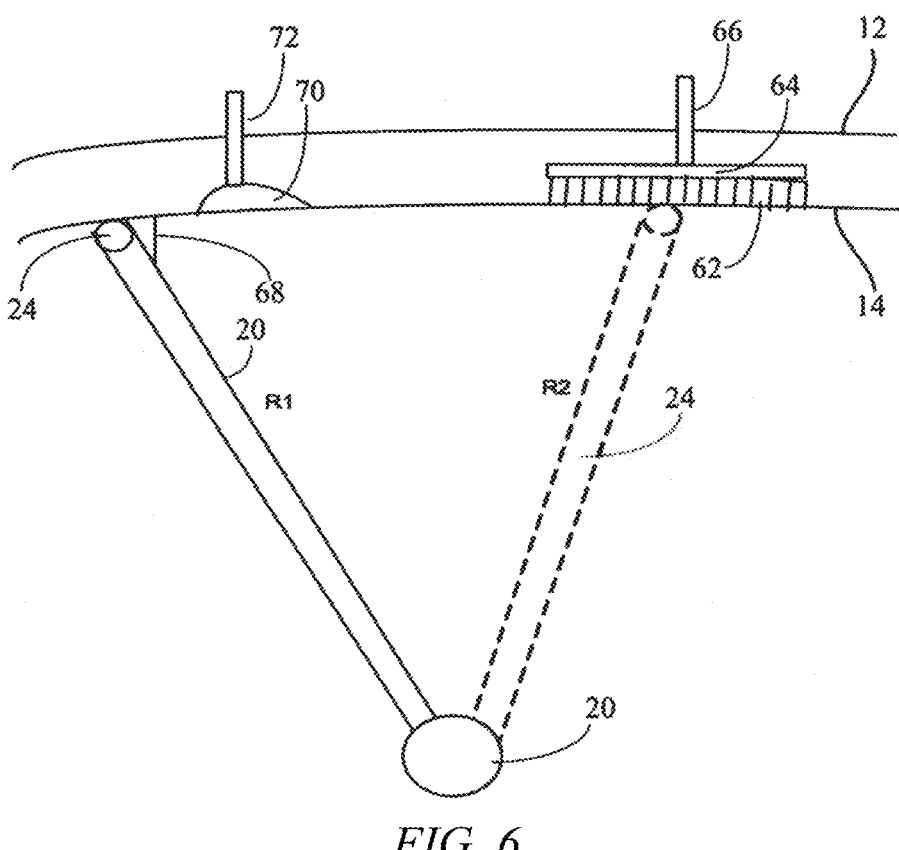
FIG. 6 illustrates a lubrication system of the rotary combustion engine.

Referring to FIG. 6, the lubrication system of the combustion engine of FIG. 1 is shown. At the beginning of the combustion period, when the rotor blade 20 reaches position R2, a laminated brush-like structure 62 inside the housing, connected to an oil reservoir 64, which is supplied by an oil supply 66. The reservoir 64 provides fresh lubricant oil into the laminated brush-like structure 62 for the next engine cycle. During the combustion period, this oil will lubricate the spherical inner wall 14 of the housing 12.

When the rotor blade 24 reaches the R1 position, the residual oil from the previous cycle is collected by a small blade 68 connected to the rotor blade 24. As the rotor blade 24 returns to its starting position, it reaches a small used oil cavity 70, a suction pump collects the residual oil from the used oil cavity 70 through an oil extraction portal 72 inside the housing 12.

Figure 7:
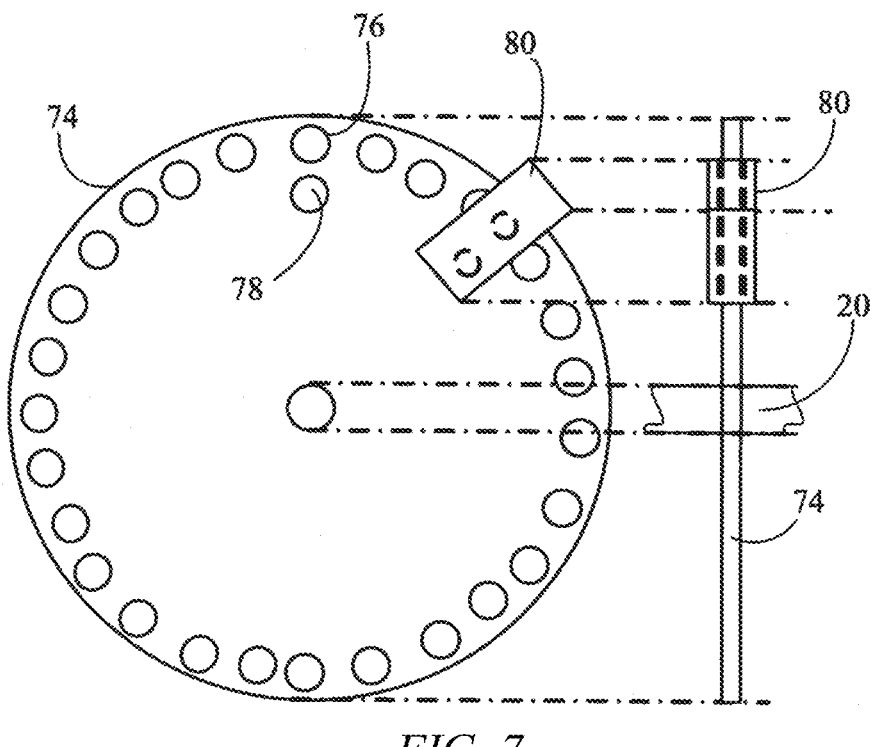
FIG. 7 illustrates a timing and control signal circular plate of the rotary combustion engine.

Referring now to FIG. 7, in order to derive timing and control signals that are synchronized to the shaft 20, a circular plate 74 is affixed to the shaft 20. The edges of the circular plate 74 have multiple first small openings 76 for timing divisions of a cycle related to the rotation of the shaft 20 and second small openings 78 along the circular plate 74 to provide an arbitrary timing designating the beginning of a cycle. A transmitter receiver photo diode 80 detects the position of the first small openings 76 and the second small openings 78, when light passes through them, triggering an electronic counter to increase the count of the counter. The count is then decoded for implementation of exact timing distribution. The second small opening 78 will cause the counter to reset at the beginning of each cycle. To increase resolution of the timing, the number of first small openings 76 may be increased.

Figure 8:
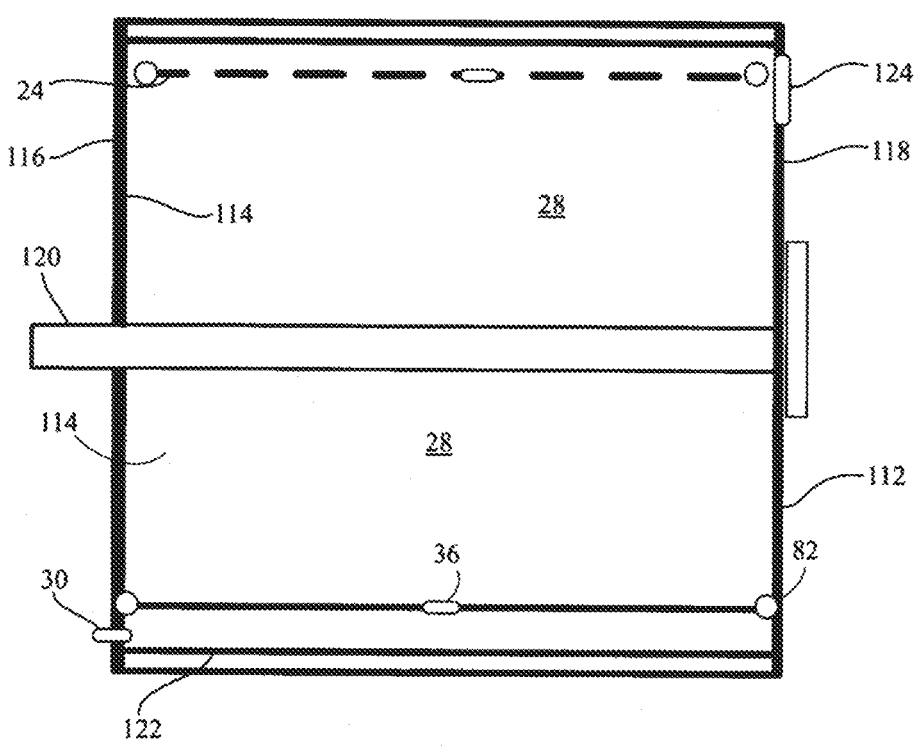
FIG. 8 illustrates a rotary suction and compression pump of the rotary combustion engine.

Referring to FIG. 8, a rotary suction and compression pump 110 is shown. The pump 110 includes a housing 112 with curved inner walls 114 forming a cylindrical enclosure. An inner shaft 120 is disposed along the center line of the of the housing 112 and provides forced motion for suction and compression. The shaft 120 extends outside of the housing 112 through a first end plate 116 and a second end plate 118 covering the open ends of the cylindrical housing 112.

A plurality of stationary blades 122 are provided, dividing the inner area of the housing 112 into areas having equal volumes or different volumes and which contact the shaft 120 along the longitude line of the shaft 120. The stationary blades 122 are attached to the inner walls of the inner housing 112, and the two end plates 116/118. A ring like piston and cylinder rings, provides multiple closed cavities 28.

A multiplicity rotor blades 24 are positioned in between the stationary blades, having a reciprocating circular motion inside the cavity, and attached to the shaft 120, moving back and forth rotating in divisions of the 360-degree in equidistant or non-equidistant providing rotations to the to a rotor providing power for the suction and compression of gas or liquid. The multiplicity of closed chambers 28 are formed inside the housing 112. Each closed chamber 28 is formed and bounded by the inner walls 114, a stationary blade 122, a rotor blade 24, and the first end plate 116 and second end plate 118 at either end of the cylindrical housing 112.

The suction and compression takes place by the forward motion of each rotor blade 24. At the start of the suction compression cycle, ambient air, or gas is sucked into the chamber, through a diode valve 36, in between the front of a stationary blade 122, and the back of a rotor blade 24, by the creation of a vacuum. As the rotor blade 24 moves forward (by operation of the shaft 120), the gas or liquid is sucked in to fill the expanding space between the front of the stationary blade 122 and the back of the rotor blade 24. When the rotor blade 24 starts to move to its original start position, the diode valve 36 opens to let the previous gas or liquid into the compression chamber 28 and fill the space between the front of the rotor blade 24 and back of the next stage stationary blade 122. The previous intake gas or liquid are then compressed by the forward motion of the rotor blade 24, compressing the gas or liquid in between the stationary blade 122 and the rotor blade 24. The pressurized gas or liquid is then pushed out of pressured air outlet valve 124. The return of the rotor blade 24 to its original position is in the same manner as the combustion cavity.

Figure 9:
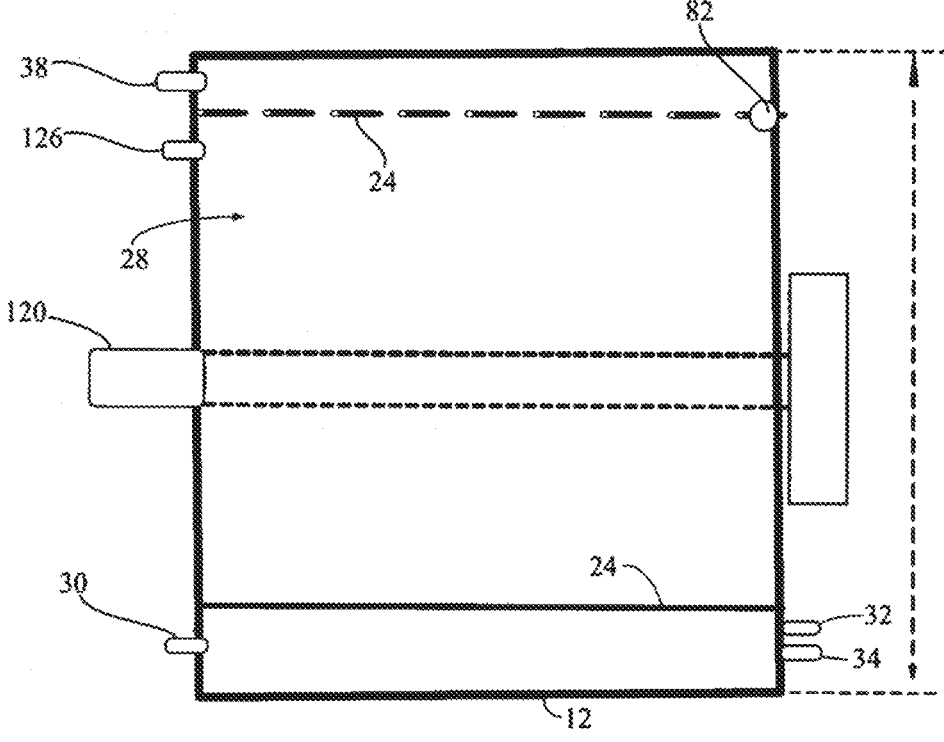
FIG. 9 illustrates an engine cooling apparatus of the rotary combustion engine.

Referring to FIG. 9, engine cooling takes place in the engine cooling cavity, by ambient air moving in and out of the cooling cavity through the ambient air opening 38 to allow the engine to be cooled; this cooling takes place while combustion or suction compression is in progress in the compression and the combustion cavities. At the beginning of a cycle, when a rotor blade 24 starts the forward motion towards the next stationary blade 26, a vacuum is generated to suck the ambient air in through an opening behind the rotor blade 24. The ambient air gets warmed up by the heat of the engine. Upon the return of the rotor blade 24 to its starting position, this warmed air is pushed out through the same opening to cool the engine. The process is repeated when the rotor blade 24, is returning to its original position, in which a vacuum is generated and cool ambient air is sucked in through another opening on the other side of the cooling cavity, to get warmed up and get pushed out through the same opening.

Referring to FIG. 10, a space (cavity) and time configuration for a three cavity engine is shown. In the implementations discussed above, for an engine of three cavities, each cavity fires once every 360 degrees, remining inactive for 240 degrees of a shaft cycle. It should be understood that the remaining 240 degrees of shaft cycle in other implementations may be used to accomplish combustion two more times, for a total of three combustions every 120 degrees. FIG. 10 shows a proposed configuration for a three cavity engine according to such a design.

In such an implementation, each cavity can fire three times per revolution, for a total of nine firings for each 360 degree revolution of the shaft. Since all of the cavities can fire some or all of the cavities within the full 360 degrees, the gear box 22 will be configured to push back a rotor blade 24 three times, one for each 120 degree time slot. In one implementation, this is accomplished in the gear box 22 by configuring the having three instances of a rotor blade 24 being pulled back instead of one.

Still referring to FIG. 10, C refers to each cavity and T refers to one of the 120 degree rotations of the shaft. Accordingly, C1 refers to the first cavity, while T1, T2, and T3 refer to each of the 120 degree rotations comprising a full 360 degree rotation. For example, C2T3 refers to cavity two at the third 120 degree of rotation within 360 degrees. The structures in FIGS. 4 and 5 pertaining to rotor blade 24 movement and the pullback function can be modified to accommodate multiple combustion cavities. Additionally, referring to FIG. 6, a solenoid may be used to accomplish the pullback function in an implementation with multiple combustion cavities. Increasing the number of firing cavities will positively affect the power of the engine, which may be used, for example, when the slope of a road changes. In one implementation, the engine may be configured such that a user can change the number of combustion cycles while the engine is in operation.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claim.

What is claimed is:

1. A rotary combustion engine comprising:
a cylindrical housing comprising a curved inner wall, a first end plate, and a second end plate;
a plurality of internal cavities within the housing;
wherein each of the internal cavities comprises a cylindrical segment of the housing;
a plurality of stationary blades attached to the inner wall, the stationary blades dividing an inner volume of the housing in pie-shaped divisions around 360-degrees of the housing;
the stationary blades connected to the inner wall of the housing and extending inward to ride along the surface of a central shaft, the stationary blades forming a plurality of sealed cavities;
wherein the central shaft is centered along a longitudinal axis of the housing along a longitudinal line of rotation of the housing; the outside surface of the shaft is sealed, and the shaft extends to a gear box outside of the housing;
wherein the stationary blades contact the shaft with a seal configured to prevent fluid leakage between each of the cavities, and wherein multiple cavities are formed in the housing such that each cavity is formed and bounded by the inner curved walls of the housing, the shaft, and at least one of the stationary blades;
wherein each cavity contains a rotor blade attached to the shaft and configured to drive the shaft, wherein each rotor blade extends outwardly to an inner curve of the housing; and
wherein each of the plurality of rotor blades has a reciprocating circular motion inside each cavity along the shaft, thereby generating rotational power, delivering compressed rotational force, and provides cooling for the cavity; and
wherein the shaft extends to a gear plate outside the housing, the gear plate comprising a gear cutout for engaging a back-and-forth transfer apparatus comprising a roller that travels along the gear plate.

2. The rotary combustion engine of claim 1 wherein the shaft provides rotational power to a vehicle, wherein compression from rotational force of the rotor blade in a single cycle comprises bi-directional semi-rotation and retraction of the rotor blade, and wherein the shaft is connected to a gear box outside of the housing, with the gear box configured to deliver bidirectional force to each rotor blade.

3. The rotary combustion engine of claim 2 wherein the gear box is configured to provide a reciprocating arc motion which drives each rotor blade back to its original position after combustion, compression, or cooling cycles.

4. The rotary combustion engine of claim 3 wherein the shaft is turned in one direction by a semi-circular gear connecting a rotor blade handle to the shaft, and wherein an outer surface of the shaft includes semi-circular segments of gears alternating with smooth semi-circular segments.

5. The rotary combustion engine of claim 4 wherein the teeth on the roller blade handle are configured to engage a semi-circular segment of gears to rotate it the shaft when the rotor blade begins a cycle, and engages a smooth semi-circular segment as the rotor blade returns to its original position.

6. The rotary combustion engine of claim 5 further comprising a pair of circular rings configured to rotate around the shaft, the circular rings connected to one of the rotor blades to guide the circular rotation of the rotor blade within the cavity, and a gear box stationed outside the cavity to return the rotor blade to its original position after combustion.

7. The rotary combustion engine of claim 1 wherein each rotor blade inside a cavity forms two sealed chambers with respect to the rotational direction of the inner shaft, the front of the stationary blade and the back of each rotor blade, and wherein the housing is provided with insertion ports from an outer surface to the curved inner walls, a pressured air valve, a fuel injection valve, and a multiplicity of spark plugs.

8. The rotary combustion engine of claim 1 further comprising an exhaust gas diode valve, and wherein each rotor blade is configured such that forward motion urges in cool ambient air by forward motion of the rotor blade while the exhaust valve is closed.

9. The rotary combustion engine of claim 1 wherein warmed air from a cavity is pushed out of the housing by each of the rotor blades before reaching the second stationary blade.

10. The rotary combustion engine of claim 1 wherein ambient air from outside the housing fills the expanding space between the front of each rotor blade and the back of a stationary blade, thereby cooling the housing.

11. The rotary combustion engine of claim 1 wherein multiple combustion cycles are active simultaneously in a 360-degree period of shaft rotation, and wherein each rotor blade gets pushed forward by ignition and is returned to its original position by the gear box.

12. The rotary combustion engine of claim 1 wherein at the start of a suction/compression cycle, ambient air enters into the chamber, through a diode valve in between a stationary blade and a rotor blade by vacuum action, and wherein each rotor blade moves to its original start position, a diode valve opens allowing combustion products into the cavity to fill the space between a rotor blade and a stationary blade, and wherein pressurized combustion products are pushed out of opening.

13. The rotary combustion engine of claim 1 wherein each of the cavities are configured to allow the engine to be cooled while a combustion cycle is in progress, wherein at the beginning of a cycle a vacuum is generated to move ambient air into an opening behind a rotor blade, wherein the ambient air is gets warmed up by the heat of the engine, and upon the return of a rotor blade, warmed air is pushed out through the same opening to cool the engine.

14. The rotary engine of claim 1 wherein oil is injected from outside of the cavity into a small segment of the inner wall of the housing, and a brush like substance capable of absorbing oil is disposed on the inner wall.

15. The rotary engine of claim 1 wherein timing is performed by a system of gears and an electromechanical device synchronized to the rotation of the shaft.

16. The rotary engine of claim 15 wherein a circular plate is attached to the shaft, wherein edges of the plate having multiple small openings for timed divisions of a cycle related to the rotation of the shaft and a small opening along the circular plate to establish an arbitrary time to designate the beginning of a cycle.

17. The rotary combustion engine of claim 1 wherein a 3-combustion engine housing completes a combustion cycle three times in every 120 degrees of rotation.

18. The rotary combustion engine of claim 1 wherein each of the rotor blades is returned in a cavity to its original position within a 360-degree revolution of the shaft.

19. The rotary combustion engine of claim 1 wherein a plurality of cavities is provided for a plurality of combustion cycles, and wherein multiple combustion cycles occur during a single 360 degree rotation of the shaft.

20. The rotary combustion engine of claim 19 wherein the engine is configured to change the number of combustion cycles while the engine is in operation.

\* \* \* \* \*